United States Patent [19]

Brault

[11] Patent Number: 4,788,851

[45] Date of Patent: Dec. 6, 1988

[54] PRESSURE VESSEL INCORPORATING A SENSOR FOR DETECTING LIQUID IN A GAS CHAMBER

[75] Inventor: Francois Brault, Vanves, France

[73] Assignee: Olaer Industries, France

[21] Appl. No.: 91,670

[22] Filed: Sep. 1, 1987

[30] Foreign Application Priority Data

Sep. 15, 1986 [FR] France ............................... 86 12843

[51] Int. Cl.[4] ............................................. G01M 3/16

[52] U.S. Cl. ....................................... 73/49.2; 73/293; 138/30

[58] Field of Search .......................... 73/49.2, 293, 40; 138/30

[56] References Cited

U.S. PATENT DOCUMENTS 4,038,650 7/1977 Evans et al. ...................... 73/293 X
4,428,401 1/1984 Chun ..................................... 138/30
4,487,226 12/1984 Chun ..................................... 138/30

*Primary Examiner*—Stewart J. Levy
*Assistant Examiner*—Joseph W. Roskos
*Attorney, Agent, or Firm*—Arthur B. Colvin

[57] ABSTRACT

A pressure vessel comprises an enclosure in which are a liquid orifice and a gas orifice spaced from the liquid orifice. A separator divides the enclosure into two variable volume chambers. One of these is a liquid chamber communicating with the liquid orifice and the other is a gas chamber communicating with the gas orifice. The separator has a transverse wall spaced from the gas and liquid orifices and movable inside the enclosure. There is an orifice in the enclosure communicating with the gas chamber through which there is passed into the gas chamber a sensor which is responsive at one end to the presence of a liquid. In a neutral position of this transverse wall the responsive end of the sensor is nearer the transverse wall than it is to the orifice in the enclosure through which it passes into the gas chamber. The sensor preferably comprises an optical probe.

28 Claims, 3 Drawing Sheets

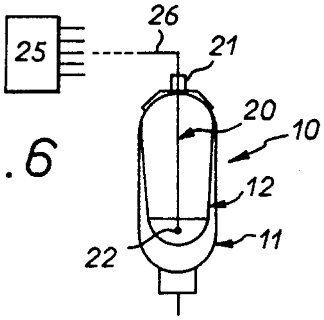
FIG. 6
FIG. 7
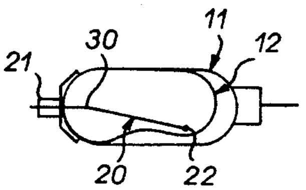
FIG. 8
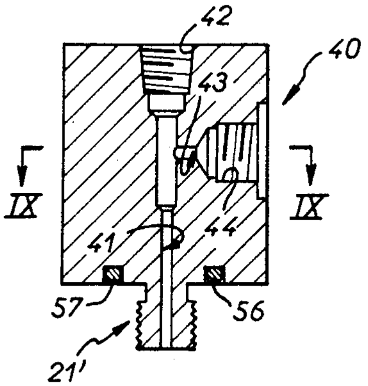
FIG. 9
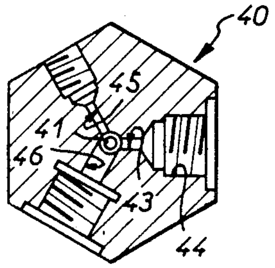
FIG. 11
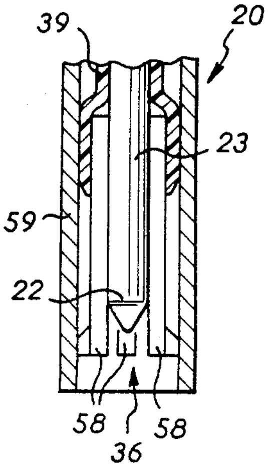
FIG. 12
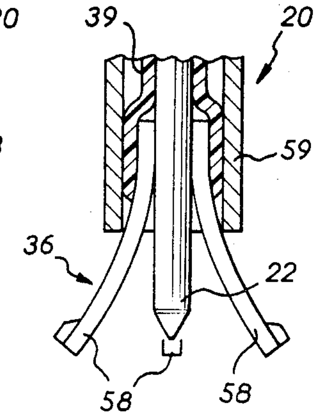
FIG. 13
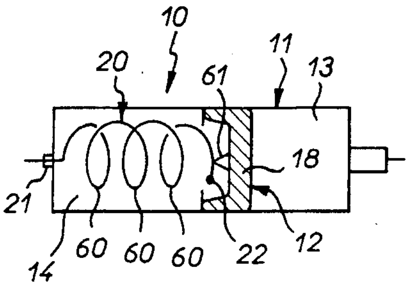

PRESSURE VESSEL INCORPORATING A SENSOR FOR DETECTING LIQUID IN A GAS CHAMBER

BACKGROUND OF THE INVENTION

1. Field of the Invention

The present invention is generally concerned with pressure vessels, that is to say vessels adapted to contain at least one fluid under pressure.

They may be either pressure storage vessels or pressure transmitting vessels.

2. Description of the Prior Art

The present invention is more particularly directed to pressure vessels of this kind which comprise within an enclosure which is in practise a rigid material enclosure a separator which divides said enclosure into two variable volume chambers, namely a liquid chamber and a gas chamber, said enclosure further comprising two spaced orifices, namely a liquid orifice and a gas orifice, with which said liquid chamber and said gas chamber respectively communicate, and which have at least transversely disposed relative to said enclosure a wall, referred to hereinafter for convenience as the transverse wall, spaced from each of said orifices and movable within said enclosure.

This separator may, for example, comprise a flexible material bag the opening in which surrounds one of the two orifices, in practise the gas orifice; in this case it is the bottom of this bag which forms what is referred to herein as the transverse wall of the separator.

As an alternative to this, the separator may comprise a piston; in this case it is the piston which forms the transverse wall, the separator itself being reduced to a transverse wall of this kind.

In all cases the separator employed is intended to isolate from each other the two fluids present within the pressure vessel concerned, one of which is a gas and the other of which is a liquid.

However, malfunctions may occur in service leading to some mixing of the two fluids, in particular by penetration of the liquid into the gas chamber.

Where the separator is a bag, for example, the bag may rupture locally or, if the liquid in question is a chemical product and the material of the bag is relatively sensitive to attack by this product, the bag may progressively become permeable resulting in diffusion of the liquid through its wall.

Similarly, if the separator is a piston the seal between the piston and the enclosure within which it slides may become defective.

The resulting defect is usually detected after the event, as a result of the inevitable consequences that arise on its downstream side, in the utilization circuit to which the pressure vessel concerned is connected.

Where, as is often the case, a number of separate pressure vessels jointly serve the same utilization circuit, it is not possible to know, on observing the effective consequences downstream, which of the pressure vessels is faulty, with the result that it is necessary to check all of them systematically.

To alleviate these disadvantages it has already been proposed to fit a pressure vessel of the kind in question with a sensor responsive to the presence of liquid, this sensor being exposed to the atmosphere in the gas chamber of the pressure vessel.

In French Pat. No. 2,422,055, this sensor is incorporated into a tubular plug in the gas orifice.

An arrangement of this kind has proved and may still prove satisfactory.

However, in what is in practise the most usual case with the pressure vessel disposed vertically with its gas orifice at the top, the sensor employed in this way responds only when the gas chamber is totally filled by the liquid, which may already be too late for the utilization circuit concerned.

The result is substantially the same when, as described in U.S. Pat. No. 4,428,401, the sensor installed in a tubular plug in the gas orifice extends to a limited degree from the gas orifice into the gas chamber.

Moreover, in this case the sensor employed, which operates by a capacitive or inductive method, is of relatively large size, especially in terms of its diameter, which may cause technical problems regarding its installation; also, because of the principle employed, it requires a considerable volume of liquid before it can output a significant signal.

A general object of the present invention is an arrangement which has the advantage of detecting a defect resulting in penetration of liquid into the gas chamber much more quickly and which has a much reduced diameter.

SUMMARY OF THE INVENTION

The present invention consists in a pressure vessel comprising an enclosure, a liquid orifice in said enclosure, a gas orifice in said enclosure, spaced from said liquid orifice, a separator whereby said enclosure is divided into two variable volume chambers, consisting of a liquid chamber communicating with said liquid orifice and a gas chamber communicating with said gas orifice, a transverse wall of said separator spaced from said gas and liquid orifices and movable within said enclosure, a sensor responsive at one end to the presence of a liquid, and an orfice in said enclosure communicating with said gas chamber and whereby said sensor passes into said gas chamber, the arrangement being such that, in a neutral position of said transverse wall, the responsive end of said sensor is nearer said transverse wall than it is to said orifice in said enclosure whereby it passes into said gas chamber.

As a result, defects can be detected much more quickly.

The sensor is preferably an optical probe comprising an optical conduit formed by one or more optical fibers and the end of which inside the enclosure forms the responsive end, while its other end is adapted to be connected to a signal processing device, either in the immediate vicinity of the pressure vessel or at some considerable distance therefrom.

An optical probe of this kind, known in itself, thus finds a particularly satisfactory application to pressure vessels on the one hand by virtue of the capacity for elastic deformation of the material from which its optical conduit is usually made and on the other hand because of the very small overall diameter of this conduit.

By virtue of the capacity for elastic deformation of the optical conduit that it comprises, the optical probe is advantageously and inherently able to absorb displacements of the transverse wall of the separator whether this comprises a bag or a piston.

Where the separator comprises a bag, the optical probe is preferably reduced to a section of optical conduit which, ignoring any flexing to which it may be subjected, is substantially straight.

This considerably facilitates the installation of an optical probe of this kind.

However, its responsive end is advantageously and systematically in the bottom part of the pressure vessel, whether the vessel is mounted vertically or, since it can flex due to its own weight, is mounted horizontally.

As an alternative to this, where the separator comprises a piston the optical probe employed in accordance with the invention preferably forms at least one turn of a helix and is coupled near its responsive end to said piston, in practise by ball-and-socket type means.

In all cases, and in accordance with a further feature of the invention, the optical conduit that the optical probe comprises is preferably sheathed over at least part of its length, by a shrinkable material, for example, which in addition to the protection that it provides advantageously makes it possible to adjust its capacity for elastic deformation, additionally preventing it becoming excessively curved where it enters the gas chamber concerned, which would compromise its durability.

According to another feature of the invention, the responsive end of the optical probe forming the sensor employed in accordance with the invention is preferably surrounded by a tubular cage, being spaced radially from the lateral wall of the cage and set back axially from its outlet.

This tubular cage advantageously protects the responsive end of the probe during the operations necessary for installing it and then advantageously protects it from any unintentional contact with the separator, avoiding it responding to possible traces of liquid on the surface of the latter while maintaining free access to said responsive end for any liquid present in the gas chamber concerned other than in the form of such traces.

By virtue of the combination of a cage of this kind and the sheathing of the optical conduit that the optical probe employed in accordance with the invention comprises, optimum benefit is obtained from the inherent capacity for elastic deformation of the optical conduit, as controled by the sheathing, this combination enabling the responsive end of the optical probe to be effectively placed in the immediate vicinity of the transverse wall of the separator without there being any adverse consequences from any possible contact with the latter, thanks to the provision of the cage.

This combination of means is therefore particularly favorable to the disposition, in accordance with the invention, of the responsive end of the optical probe in the proximity of the transverse wall of the separator.

Also, because of its extremely small overall diameter, which is less than 2.5 mm in practise, the optical probe forming the sensor employed in accordance with the invention is advantageously much easier to install in a pressure vessel.

This characteristic is particularly favorable in the case where the separator of the pressure vessel concerned comprises a bag since the orifice in the enclosure of the pressure vessel by means of which the optical probe is fitted then is merely the gas orifice of this enclosure, which makes it possible to use the usual standard diameters of the axial passages through the valve body as normally fitted to the gas orifice for inflating the bag.

A specific result of this is that the sensor employed in accordance with the invention is equally suited to pressure vessels to be constructed and to existing pressure vessels, which can advantageously be fitted with a sensor of this kind if required, very simply and at minimum cost.

For the purpose of fitting it to the pressure vessel, the sensor is in practise preferably carried by a tubular plug adapted to fit the orifice in the enclosure of the pressure vessel through which it passes into the corresponding gas chamber.

However, in accordance with the invention and in the case where the separator of the pressure vessel concerned is a bag, installation is advantageously effected by means of an adapter body which has at respective ends of an axial passage a projecting tubular plug by means of which it is adapted to be fitted to a pressure vessel, to be more precise to the valve body usually fitted to the gas orifice in the enclosure thereof, in place of the valve usually fitted to a valve body of this kind, and a recess by means of which it is adapted to receive the tubular plug carrying the sensor to be fitted, said adapter body being further adapted by a transverse passage communicating with the previously mentioned axial passage to receive said valve.

This adapter body thus makes it a particularly simple matter to fit the sensor.

The characteristics and advantages of the invention will emerge from the following description given by way of example only and with reference to the appended diagrammatic drawings.

BRIEF DESCRIPTION OF THE DRAWINGS

FIG. 6 is a view analogous to that of FIG. 1 and showing how the sensor operates.

FIG. 7 is a view, also analogous to that of FIG. 1, showing another possible orientation of the pressure vessel concerned.

FIG. 8 is a view in axial cross-section of an adapter body that can be used in accordance with the invention to support the tubular plug carrying the sensor.

FIG. 9 is a view of this adapter body in transverse cross-section on the line IX—IX in FIG. 8.

FIG. 11 is a view analogous to that of FIG. 5 and relating to an alternative embodiment.

FIG. 12 is a view analogous to that of FIG. 10 showing how this alternative embodiment functions.

FIG. 13 is a view analogous to that of FIG. 7 and relating to another type of pressure vessel.

DESCRIPTION OF THE PREFERRED EMBODIMENTS

Figure 1:
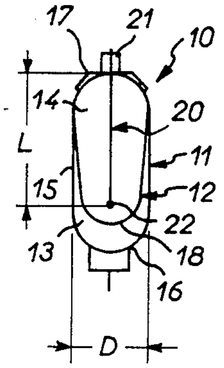
FIG. 1 is a view in elevation and cross-section of a pressure vessel equipped in accordance with the invention with a sensor.
Figure 5:
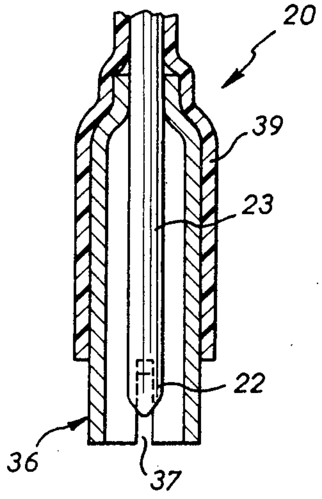

As schematically represented in FIGS. 1, 6 and 13, the invention concerns a pressure vessel 10 of the kind comprising within an enclosure 11, which is in practise made from a rigid material, a separator 12 which divides the internal volume of said enclosure 11 into two variable volume chambers, namely a liquid chamber 13 and a gas chamber 14, said enclosure 11 itself comprising two spaced orifices, not shown in these figures, namely a liquid orifice and a gas orifice, and said liquid chamber 13 and said gas chamber 14 respectively communicate with said orifices.

In the embodiment specifically shown in FIGS. 1, 6 and 7 the enclosure 11 is generally elongate and thus forms over part at least of its length, in practise over its middle part, a cylinder 15 of diameter D, while its ends 16 and 17 form respective hemispheres.

The liquid orifice and the gas orifice are on the axis of the assembly, the former at the centre of the end 16, that which is generally at the bottom when the pressure vessel 10 is placed vertically (FIGS. 1 and 6) and the latter at the centre of the end 17, that which is generally at the top for this orientation of the pressure vessel 10.

In the embodiment shown in FIGS. 1, 6 and 7, the separator 12 is a bag, in practise a bag of flexible material which is also elongate, like the enclosure 11, and the opening in which, usually called the mouth, surrounds the gas orifice of the enclosure.

The blind end of this bag at its other end forms what is referred to herein as a transverse wall 18, this transverse wall 18, which is in fact generally hemispherical, extending generally transversely relative to the enclosure 11.

Spaced from both the liquid and gas orifices of the enclosure 11, the transverse wall 18 of the separator 12 is able to move within the enclosure 11, because of contraction or expansion within the enclosure of the bag which constitutes the separator 12 in this case.

These arrangements are well known in themselves and as they do not form part of the present invention they will not be described in further detail here.

In a manner that is also known in itself there is placed in the resulting pressure vessel 10 a sensor 20 which is responsive to the presence of a liquid and which passes into said gas chamber 14 through an orifice in the enclosure 11 communicating with the gas chamber 14.

In practise the sensor 20 is carried by a tubular plug 21 fitted into the orifice in the enclosure 11 through which it passes.

As will be described in more detail later, this orifice is the gas orifice of the enclosure 11.

The tubular plug 21 is a conically threaded plug which inherently provides the necessary seal.

For at least a neutral position of the transverse wall 18 of the separator 12, the responsive end 22 of the sensor 20 (in practise its free end) is nearer said transverse wall 18 than the orifice in the enclosure 11 through which it passes into the gas chamber 14 or, in other words, the tubular plug 21 fitted to this orifice.

In accordance with the invention, the sensor 20 is preferably an optical probe.

Optical probes of this kind are well known in themselves.

They are described, for example, in French Pat. No. 2,130,037.

Thus they will not be described in complete detail here.

It will suffice to specify that the sensor 20 comprises an optical conduit 23 which is its major component part and which is itself formed by at least one optical fiber.

The end of this optical conduit 23 inside the enclosure 11 forms its responsive end 22.

This responsive end 22 shown here is slightly tapered and it has a rounded end.

It may have any other configuration, however, and in particular either of those described in French Pat. No. 2,130,037 mentioned above.

The other end of the optical conduit 23 is adapted to be connected to a signal processing device 25, as shown schematically in FIG. 6.

The corresponding connection 26 may be provided by the optical conduit 23 itself, which extends out of the enclosure 11 to this end.

As an alternative, the connection 26 may be made by an electrical conductor.

Figure 2:
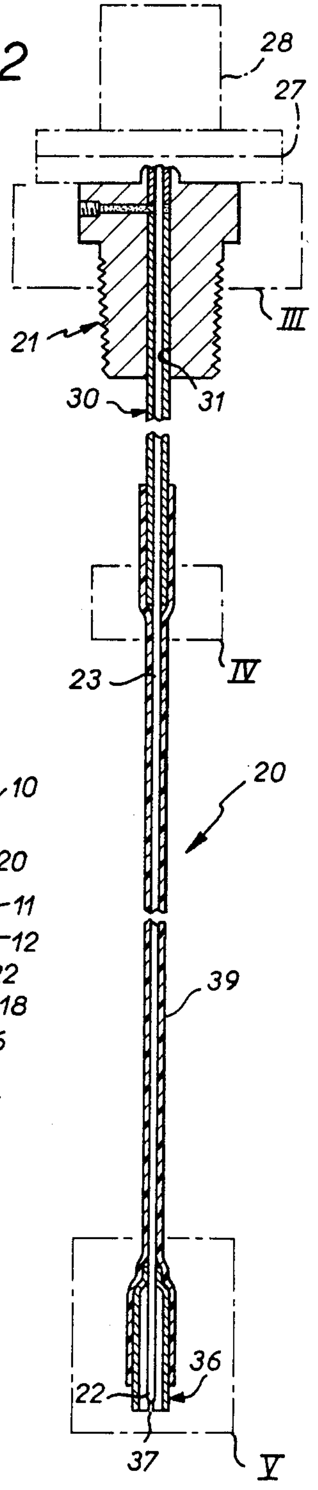
FIG. 2 is a view to a large scale and in axial cross-section of this sensor and the tubular plug that carries it.

In this case, as schematically represented in dashed outline in FIG. 2, a plate 27 may be fitted to the tubular plug 21 on which is mounted a connector 28 adapted to convert the optical signal to an electrical signal, in other words to serve as an interface between the optical conduit 23 and the electrical conductor.

It should be noted, however, that a direct connection by the optical conduit 23 from the sensor 20 to the signal processing device 25 has the advantage of being much more reliable and of being insensitive to interference, which may make its use necessary in the case where the pressure vessel 10 concerned is in an environment not compatible with a signal processing device 25 of this kind, for example a humid, chemically aggressive and/or explosive environment, the signal processing device 25 then being advantageously at a location remote from that of the pressure vessel 10 itself.

The connection 26 may equally well be provided by an optical conduit separate from the optical conduit 23 of the probe forming the sensor 20, of course, and in this case the connector 28 is of a kind adapted to provide a connection between two optical conduits.

In practise the optical conduit 23 is of very small diameter, usually less than 1 mm or even 0.5 mm.

The material from which it is made has an inherent capacity for elastic deformation.

Given this capacity for elastic deformation of its optical conduit 23 and its elongate character, with limited overall transverse dimensions, the optical probe forming in accordance with the invention the sensor 20 is able to flex under its own weight.

In the embodiment shown in FIGS. 1, 6 and 7 the optical probe is reduced in practise to a section of optical conduit 23 which, ignoring any such flexing, is substantially straight.

In practise the length L of this section of optical conduit 23 and thus of the optical probe forming the sensor 20, as measured from the tubular plug 21 carrying the latter, is preferably greater than 1.5 times the diameter D of the cylinder 15 that the middle part of the enclosure 11 of the pressure vessel 10 forms.

In the embodiment shown in FIGS. 1 and 6, in which the pressure vessel 10 is disposed vertically with its gas orifice at the top, the optical probe forming the sensor 20 remains substantially straight, being as it were suspended from the tubular plug 21 from which it extends.

However, in the embodiment shown in FIG. 7, in which the pressure vessel is disposed horizontally, the optical probe then extends cantilever fashion into the gas chamber 14 and curves because of its own weight.

Over part at least of its length from the tubular plug 21 the optical conduit 23 of the optical probe forming the sensor 20 is surrounded by a tubular guide 30 which itself projects cantilever fashion from said tubular plug 21.

This tubular guide 30 and is formed by a capillary tube and may be made of metal, for example.

In this case, sealed into a bore 31, in practise an axial bore, in the tubular plug 21, it is attached to the latter by welding or brazing.

To confer progressive flexibility on the optical probe forming the sensor 20 where it enters the gas chamber 14, it is preferably and advantageously itself made from a flexible material, such as an elastomer material, for example.

In this case it is adhesively bonded to the tubular plug 21.

In all cases the optical conduit 23 is itself preferably bonded to the tubular guide 30 which thus accompanies it over part of its length.

This bonding may be achieved in the following way, for example: there is provided in the tubular plug 21 a transverse bore 32 which intersects the bore 31 and subdivides the tubular guide 30 into two separate sections 30A, 30B and which is used to inject adhesive under pressure into the gap between the optical conduit 23 and said sections 30A, 30B of the tubular guide 30, the transverse bore 32 then being closed by a plug 33.

The sensor 20 passes through the tubular plug 21 in a fluid-tight or sealed manner.

The tubular guide 30 shown here has at its free end, at the inside edge of its outlet, a chamfer 35 which, by making the corresponding edge oblique, makes it possible to protect the optical conduit 23 against any deflection thereof relative to the tubular guide 30.

The responsive end 22 of the sensor 20 shown here is surrounded by a tubular cage 36, being spaced radially from the lateral wall of the latter and set back axially relative to its outlet.

Figure 3:
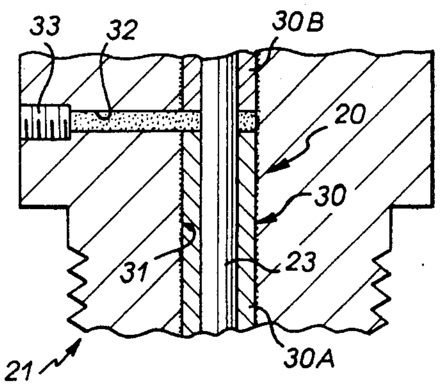
FIGS. 3, 4 and 5 show to a still larger scale the parts of FIG. 2 marked III, IV and V.
Figure 4:
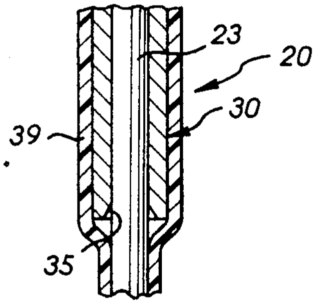

In the embodiment shown in FIGS. 2 and 3 the tubular cage 36 is rigid and fixed.

It is formed, for example, by a section of metal tube the end of which opposite its outlet is appropriately crimped onto the optical conduit 23.

The lateral wall of the tubular cage 26 is of sufficient diameter for a meniscus of liquid to form between it and the responsive end 22 of the optical conduit 23.

It must therefore have a diameter greater than that of the meniscus.

In practise a diameter in the order of 3 mm is satisfactory for all types of liquid.

This numerical value is given here by way of example only, of course, and must not in any way be regarded as limiting the invention.

To facilitate wetting of the responsive end 22 of the optical conduit 23 the tubular cage 36 shown here has at least one axial slot 37 extending away from its outlet.

Two such slots 37 may be provided, for example, disposed at diametrally opposed positions relative to each other.

Over at least part of its length the optical conduit 23 of the optical probe forming in accordance with the invention the sensor 20 is covered by a sheath 39, both to protect it and to reduce its capacity for elastic deformation.

The sheath 39 preferably extends at least from the tubular guide 30 and at least as far as the tubular cage 36.

In the sensor shown here it extends without any discontinuity from the tubular guide 30, which it partially covers, to the tubular cage 36, which it also partially covers.

In practise the sheath is made of a synthetic material, for example an elastomer material.

It is preferably of a shrinkable material, a heat-shrinkable material, for example, which facilitates fitting it and enables it to mate better with the parts it surrounds, namely the tubular guide 30, the optical conduit 23 and the tubular cage 36.

If, as schematically represented in FIG. 6, there occurs at least localized rupturing of the bag constituting the separator 12 and if the quantity of liquid that enters the bag is sufficient for the responsive end 22 of the sensor 20 to be immersed in it, the output signal from the sensor 20 changes state and the signal processing device 25 then detects this change of state.

As schematically represented by respective lines in FIG. 6, a number of pressure vessels 10 may be connected to the same signal processing device 25 which, on receiving a signal indicating that one of them is defective, can identify which of the pressure vessels 10 is defective.

It is clear from what has been described that if the pressure vessel 10 in accordance with the invention is disposed vertically, as shown in FIG. 6, with its gas orifice at the top, the responsive end 22 of the sensor 20 is advantageously in the lower part of the gas chamber 14, which enables virtually instantaneous detection of any entry of liquid thereto.

The same applies when the pressure vessel 10 is disposed horizontally, as in the embodiment shown in FIG. 7.

This is because, due to the resulting curvature of the sensor 20 due to its own weight, its responsive end 22 is, as previously, in the lower part of the gas chamber 14.

The optical probe forming the sensor 20 is preferably fitted, in accordance with the invention, to the pressure vessel 10 by means of an adapter body 40 shown in isolation in FIGS. 8 and 9.

At respective ends of an axial passage 41 the adapter body 40 has, at the bottom, a projecting tubular plug 21' by means of which, as will be described in more detail later, it is adapted to be attached to the pressure vessel 10 and, at the top, a threaded recess 42 through which it is adapted to receive the tubular plug 21 carrying the sensor 20 to be installed.

In the embodiment shown the threaded recess 42 is therefore conical, like the tubular plug 21.

On the other hand, the tubular plug 21', which is threaded like the tubular plug 21, is cylindrical.

The diameter of the axial passage 41 is sufficient to enable the optical probe forming the sensor 20 to pass through it.

It is therefore greater than the largest diameter of the latter, as measured in practise at the level of the cage 36.

The adapter body 40 also has a transverse passage 43 which communicates with its axial passage 41 and by means of which, as will emerge hereinafter, it is adapted to receive a valve (not shown), the transverse passage having a threaded bore 44 at its free end for this purpose.

In practise the tubular plug 21' is complementary to this threaded bore 44.

The adapter body 40 shown here comprises three transverse passages which all communicate with its axial passage 41 and all of which have a threaded bore at their free end, namely, in addition to the previously mentioned transverse passage 43, which is adapted to enable feeding of gas into the gas chamber 14 of the pressure vessel 10 concerned, a transverse passage 45 which is adapted, for example, to enable the installation of a pressure sensor (not shown) and a transverse passage 46 which is adapted, for example, to enable the installation of a temperature sensor (also not shown), these pressure and temperature sensors being adapted to provide complementary information as to correct functioning of the pressure vessel 10.

Finally, the adapter body 40 shown here is in the form of a cylindrical block of polygonal (in practise hexagonal) transverse cross-section, in the manner of a nut, which facilitates actuation of it in rotation to screw it in or unscrew it and which thus facilitates fitting it to the pressure vessel 10.

Figure 10:
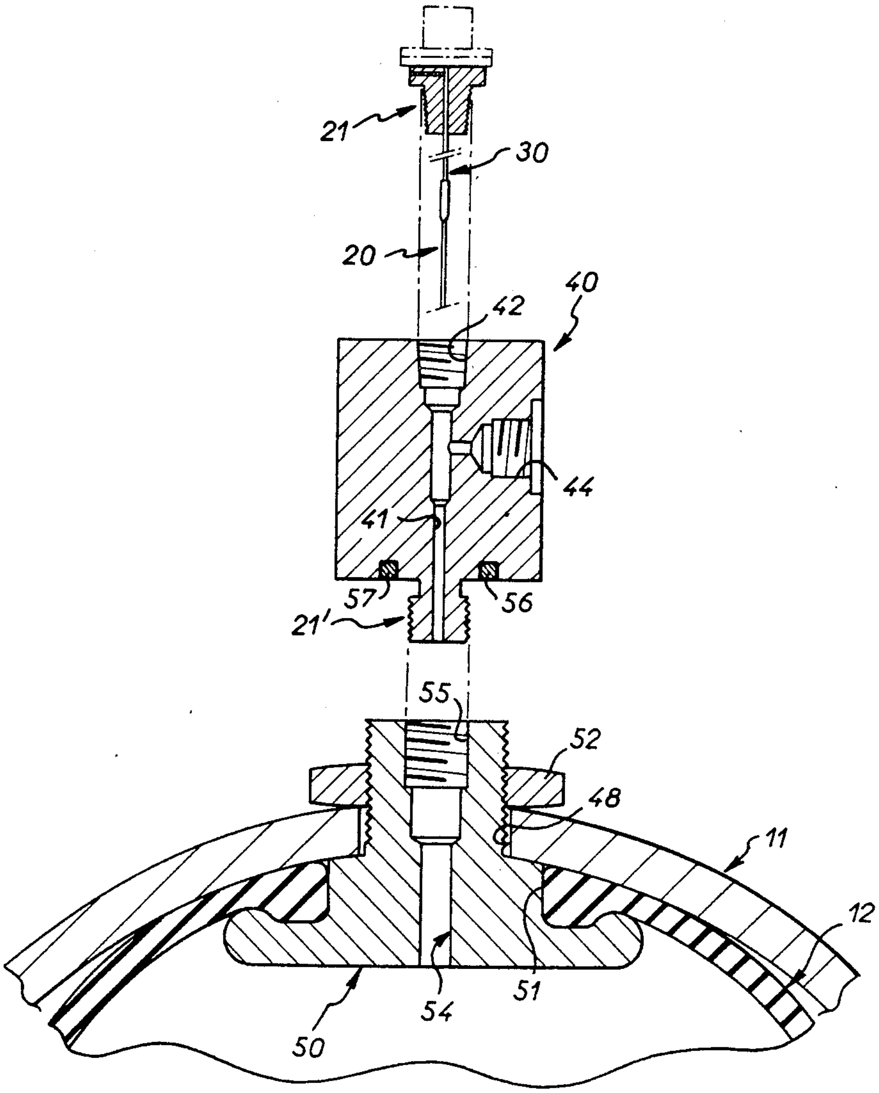
FIG. 10 is an exploded view, partly in axial cross-section, to the same scale as FIGS. 8 and 9 and showing the use of this adapter body.

FIG. 10 shows the use of an adapter body of this kind, representing part of the enclosure 11 of a pressure vessel 10 with its gas orifice 48 and the bag forming the separator 12 that it contains.

As shown, a valve body 50 is fitted to the gas orifice 48 and, surrounded inside the enclosure 11 by the opening 51 of the bag forming the separator 12, secures the bag into the enclosure 11 in a scaled manner, being itself attached to the enclosure 11 by a nut 52 external to the latter.

These arrangements are well known in themselves and as they do not form part of the present invention they will not be described in more detail here.

In a way that is also known in itself the valve body 50 comprises an axial passage 54 and, at the end of this outside the enclosure 11, a threaded bore 55 adapted for fitting a valve (not shown) for inflating the bag forming the separator 12.

In accordance with the invention, the tubular plug 21' of the adapter body 40 has the same dimensions as the threaded bore 55, which are usually standardised, and is therefore adapted to be substituted for the valve normally fitted into the threaded bore 55, the latter being transferred into its own threaded bore 44.

To this end the latter has the same dimensions as the threaded bore 55 and thus as the tubular plug 21', at least in terms of its diameter.

Thus the sensor 20 employed in accordance with the invention may advantageously be fitted to an existing pressure vessel 10, if required.

There is provided on the inside surface of the adapter body 40 shown here, in a groove 56, an O-ring 57 which cooperates with the corresponding upper surface of the valve body 50 to establish a seal.

Thus in practise the cantilever-fashion projection of the sensor 20 into the gas chamber 14 runs only from the valve body 50, even if in theory it runs from the tubular plug 21 carrying the sensor 20.

In the alternative embodiment shown in FIGS. 11 and 12 the tubular cage 36 is formed by arms 58 that are movable between a retracted position (FIG. 11) in which they are substantially parallel to the responsive end 22 of the sensor 20, being disposed around the latter, and a deployed position (FIG. 12) in which their free ends are separated from the responsive end 22, and the cage 36 formed in this way by such mobile arms 58 is surrounded by a tube 59 which is movable axially from outside the pressure vessel 10 concerned and is adapted to hold said arms 58 in the retracted position when it is itself in an advanced position (FIG. 11) and to release them when it is in a retracted position (FIG. 12).

The sensor 20 is naturally fitted into the pressure vessel 10 with the mobile arms 58 in the retracted position, in order to facilitate such fitting, and it is only after this has been done that, by retracting the tube 59, the mobile arms 58 are allowed to move to the deployed position, the insertion being only partial at first so as to leave enough of the tube on the outside for it to be maneuvered effectively.

The distance between the responsive end 22 of the sensor 20 and the free ends of the arms 58 once these have been deployed in this way is then increased, which is particularly suited to the case where the liquid in the liquid chamber 13 is relatively viscous, as it is then relatively easier for the liquid to reach the responsive end 22.

As shown in FIG. 13, the separator 12 may in the usual way consist of a piston mounted to move transversely within the enclosure 11.

This piston then itself forms the transverse wall 18 of the separator 12, the separator 12 being in this case reduced to the transverse wall 18.

The optical probe employed as the sensor 20 in this case forms at least one turn 60 of a helix and, in the vicinity of its responsive end 22, it is attached by fixing means 61 to the piston which here forms the transverse wall 18.

The optical probe shown here in fact comprises a number of helical turns 60.

The fixing means 61 by which it is attached to the piston forming the transverse wall 18 are preferably ball-and-socket means to allow for any rotation of the piston within the enclosure 11 about the axis of the assembly.

In all other respects the arrangement is as previously described.

In the foregoing it has been assumed that the optical probe forming in accordance with the invention the sensor 20 is fitted in advance into the pressure vessel 10 concerned and that it is intended to remain there permanently.

However, it is obvious that the scope of the present invention is not exceeded by placing an optical probe of this kind in a pressure vessel of this kind only when checking the latter.

The present invention is not limited to the embodiments described and shown, but encompasses any variant execution thereof.

Specifically, the sheath around the optical fibers of the optical probe preferably employed as the sensor may, if required, be molded over the assembly, rather than being made from a shrinkable material.

Also, although the sensor employed is preferably an optical sensor, for the reasons given, the scope of the invention is not exceeded by substituting another type of sensor for it.

Moreover, the orifice in the enclosure of the pressure vessel by means of which the sensor passes into the gas chamber of the latter is not necessarily the gas orifice of this enclosure.

It may equally well be a specific orifice in the enclosure fitted with a tubular plug carrying the sensor.

In this case the cantilever-fashion projection of the sensor into the gas chamber is from this tubular plug.

Finally, the enclosure of the pressure vessels concerned is not necessarily cylindrical or elongate.

It may equally well be spherical.

I claim:

1. Pressure vessel comprising an enclosure, a liquid orifice in said enclosure, a gas orifice in said enclosure, spaced from said liquid orifice, a separator dividing said enclosure into a variable volume liquid chamber communicating with said liquid orifice and a variable volume gas chamber communicating with said gas orifice, a transverse wall of said separator spaced from said gas and liquid orifices and movable within said enclosure, an optical sensor means extending through said envelope at a predetermined location into said gas chamber and having an end responsive to the presence of liquid in said gas chamber, said responsive end being nearer to said transverse wall than to said predetermined location, said optical sensor means being of flexible construction and elastically deformable in response to the movements of said transverse wall without damage to said wall.

2. Pressure vessel according to claim 1, wherein said separator is a bladder of flexible material having a bottom forming said transverse wall and said sensor means has an optical conduit of substantially straight section, in its undeformed condition.

3. Pressure vessel according to claim 2, further comprising a tubular plug carrying said optical sensor means and wherein said enclosure is elongate and is cylindrical over at least part of its length, and the length of said section of optical conduit from said tubular plug is greater than 1.5 times the diameter of said cylinder.

4. Pressure vessel according to claim 2, wherein the pressure vessel is orientated so that the optical conduit extends substantially vertically and said responsive end is located facing the bottom of the bladder of flexible material.

5. Pressure vessel according to claim 1, further comprising a tubular cage surrounding said responsive end of said optical sensor means which is radially spaced from the lateral wall of said cage and axially set back relative to its outlet.

6. Pressure vessel according to claim 5, wherein said tubular cage is rigid and fixed.

7. Pressure vessel according to claim 6, wherein said lateral wall of said tubular cage comprises at least one axial slot extending away from its outlet.

8. Pressure vessel according to claim 5, wherein said tubular cage comprises arms movable between a retracted position in which they extend substantially parallel and around said responsive end of said optical sensor means and a deployed position in which free ends of said arms are spaced from said responsive end, and further comprising a tube surrounding said cage and movable axially to hold said arms in said deployed position when said tube is in an advance position and to release said arms when said tube is in a retracted position.

9. Pressure vessel according to claim 5, further comprising a sheath covering said optical conduit of said optical sensor means over part at least of its length, and wherein said sheath extends at least as far as said tubular cage.

10. Pressure vessel according to claim 1, further comprising an adapter body fixing said sensor to said enclosure and having an axial passage, a projecting tubular plug at one end of said passage for attachment to said enclosure and a recess at the other end of said passage for receiving a tubular plug carrying said optical sensor means.

11. Pressure vessel according to claim 10, further comprising a valve body fitted to said gas orifice of said enclosure and wherein said separator is a bladder, said tubular plug on said adapter body is adapted to fit said valve body, said actuator body having an axial passage and a transverse passage communicating with said axial passage and adapted to receive a valve, and said transverse passage having the same diameter as said tubular plug.

12. Pressure vessel according to claim 11, wherein said adapter body comprises at least one further transverse passage adapted for fitting another optical sensor means.

13. Pressure vessel according to claim 10, wherein said tubular plug is threaded and is in the form of a block of polygonal transverse cross-section.

14. Pressure vessel according to claim 10, wherein said axial passage of said adapter body has a diameter at least equal to a maximum diameter of said optical sensor means.

15. Pressure vessel according to claim 1, wherein said responsive end of said optical sensor means is located in proximate relation to said transverse wall.

16. Pressure vessel comprising an enclosure, a liquid orifice in said enclosure, a gas orifice in said enclosure, spaced from said liquid orifice, a separator dividing said enclosure into a variable volume liquid chamber communicating with said liquid orifice and a variable volume gas chamber communicating with said gas orifice, a transverse wall of said separator spaced from said gas and liquid orifices and movable within said enclosure, an optical sensor means extending through said envelope at a predetermined location into said gas chamber and having an end responsive to the presence of liquid in said gas chamber, said optical sensor means being of flexible construction and elastically deformable in response to the movements of said transverse wall without damage to said wall, said optical sensor means comprising a continuous optical conduit of relatively small diameter extending between said responsive end and a remote end adapted to be connected to a signal processing device, said optical conduit being formed by at least one optical fiber, and said responsive end being nearer to said transverse wall than to said predetermined location.

17. Pressure vessel according to claim 16, further comprising a tubular plug carrying said optical conduit.

18. Pressure vessel according to claim 17, further comprising a tubular guide surrounding said optical conduit over at least part of its length from said tubular plug and extending cantilever fashion from said tubular plug.

19. Pressure vessel according to claim 18, wherein said tubular guide has a chamfered inside outlet edge at its free end.

20. Pressure vessel according to claim 18, wherein said tubular guide is made from a flexible material.

21. Pressure vessel according to claim 17, wherein said tubular plug also carries a connector adapted to convert an optical signal into an electrical signal.

22. Pressure vessel according to claim 17, wherein said tubular plug also carries a connector adapted to provide a connection between two optical conduits.

23. Pressure vessel according to claim 16, wherein said optical sensor means extends cantilever-fashion into said gas chamber.

24. Pressure vessel according to claim 16, wherein said separator is a piston forming said transverse wall and said optical sensor means comprises at least one turn of a helix and is coupled to said piston in the vicinity of said responsive end.

25. Pressure vessel according to claim 16, further comprising a sheath covering said optical conduit of said optical probe forming said sensor over part at least of its length.

26. Pressure vessel according to claim 25, wherein said sheath is made from a shrinkable material.

27. Pressure vessel according to claim 25, further comprising a tubular guide surrounding said optical conduit of said optical probe forming said sensor over at least part of its length from said tubular plug and extending cantilever fashion from said tubular plug and wherein said sheath extends at least from said tubular guide.

28. Pressure vessel according to claim 16, wherein said responsive end of said optical sensor means is located in proximate relation to said transverse wall.

* * * * *